Figure 1:
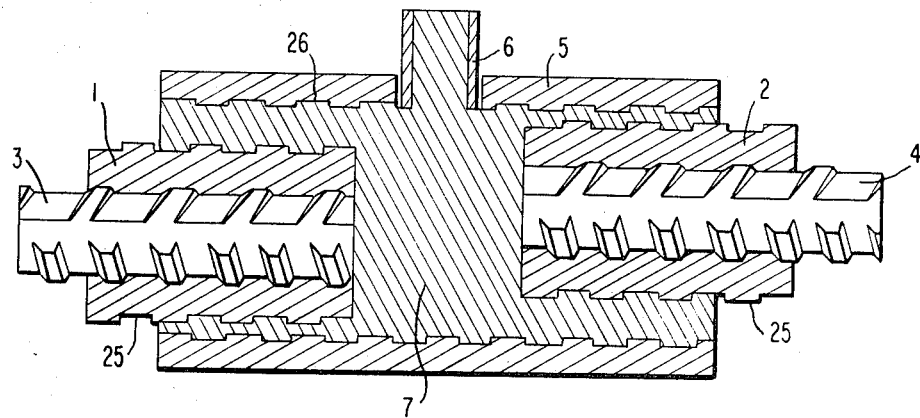

United States Patent

Guntermann

[15] 3,638,978

[45] Feb. 1, 1972

[54] SLEEVE JOINT FOR CONNECTING STEEL INSERTS IN STEEL-CONCRETE CONSTRUCTION

[72] Inventor: Hans Guntermann, Essen-Steele, Germany

[73] Assignee: Elektro-Thermit G.m.b.H., Essen, Germany

[22] Filed: Dec. 21, 1967

[21] Appl. No.: 692,526

[30] Foreign Application Priority Data

Dec. 24, 1966 Germany...............................D 34794

[52] U.S. Cl.................................287/108, 52/726, 164/53, 164/108, 164/110, 164/111, 164/DIG. 12
[51] Int. Cl.......................................................F16b 7/00
[58] Field of Search....................287/108, 127 E, 77, 78, 75, 287/76, 82, 81, 80, 20.2; 52/726, 722; 164/98, 108, 110, 53, DIG. 12, 111, 334; 285/284, 291, 292, 297; 29/460

[56] References Cited

UNITED STATES PATENTS

| 1,689,281 | 10/1928 | Forssel..................................287/108 |
| 2,515,191 | 7/1950 | Carpenter et al. .................164/108 X |

FOREIGN PATENTS OR APPLICATIONS

| 812,251 | 2/1937 | France..................................164/108 |

Primary Examiner—David J. Williamowsky
Assistant Examiner—Wayne L. Shedd
Attorney—James E. Bryan

[57] ABSTRACT

This invention relates to a sleeve joint for connecting steel inserts in steel-concrete construction which comprises shaped metal bodies secured to the ends of the inserts to be connected, sleeve means enclosing at least part of both of the shaped metal bodies and being of larger diameter than said bodies, and aluminothermically produced metal in the space between the sleeve means and said bodies.

10 Claims, 4 Drawing Figures

3,638,978

INVENTOR
HANS GUNTERMANN

SLEEVE JOINT FOR CONNECTING STEEL INSERTS IN STEEL-CONCRETE CONSTRUCTION

SUMMARY OF THE DISCLOSURE

The present invention relates to a sleeve joint for connecting steel inserts, preferably reinforcing steels, used in steel-concrete construction, and more particularly relates to connecting prefabricated structural steel-concrete elements, by using a sleeve and aluminothermically produced metal.

In steel-concrete construction it is known to connect concrete-reinforcing ribbed steels by means of sleeve joints. This is effected, for example, by enclosing the ends of the profiled steel inserts subject to stress with a steel pipe joint which is internally profiled in a threadlike manner, and by filling the cavities between the steel ends and the sleeves with aluminothermically produced metal, preferably steel.

This butt joint requires that the steel inserts have correspondingly profiled surfaces and be so designed with respect to the quality thereof that their physical properties are not impaired by heat, such as will be produced when molten aluminothermically produced metal is poured into the sleeve.

Also employed, however, for the construction of buildings from steel-concrete are steel inserts which do not have a profile suitable for the sleeve joint, or, for example, so-called reinforcing steels whose physical properties are considerably impaired by the subsequent action of heat, so that the sleeve joint it not suitable as a connection for such steel inserts.

It is known in the art to connect threaded bracing or clamping members with the aid of threaded sleeves. This, however, can be accomplished only if the bracing members are movable to a large extent. In the case of prefabricated structural concrete elements, for example, the ends of the reinforcing rods projecting at the end faces can not be joined in this fashion since neither the installation of the reinforcing rods, nor the construction and assembly of the finished parts is without tolerances, which latter must be compensated for in the joint.

The present invention provides a means for connecting, in a thermally unaffected manner, reinforcing steels of finished concrete parts which are, more particularly, not in precise alignment with each other, as well as steel inserts which do not have a profile suitable for the known sleeve joint, in a manner such that the tractive forces and pressures can be transmitted free from slippage.

The present invention provides a sleeve joint in which shaped steel bodies, preferably being profiled at the surfaces thereof in a threadlike manner, either each enclose one end of the steel reinforcing rods in the form of a sleeve, or are connected therewith at the end faces thereof. The shaped steel bodies, in turn, are enclosed at a distance by an internally profiled steel pipe sleeve, and the cavity formed between the sleeve and the steel bodies is filled with aluminothermically produced metal, preferably steel.

In a preferred embodiment of the sleeve joint of the present invention, the externally profiled shaped steel bodies are provided with internal threads and are screwed onto the ends of steel rods having corresponding external threads.

In a further embodiment of the present invention, one end of a steel rod is connected with an externally profiled shaped steel body, the opposite end of the steel rod is connected with an internally profiled shaped steel body being simultaneously constructed as a sleeve, in which case the internally profiled body will enclose with a certain distance or gap the externally profiled body, and the cavity thus produced is filled with aluminothermically produced metal, preferably steel.

The sleeve joint of the present invention is particularly suitable for connecting the reinforcing steels of finished concrete elements, such as, for example, track mounting or supporting plates, where tightening or adjusting nuts, for example, are screwed onto the ends of the reinforcing steel and serve for transmitting the elastic forces into the anchoring structure. These nuts enclose, for example, the ends of the tie rods in the full length thereof with which they project beyond the end face of the finished parts or elements. In the present invention, these tightening nuts, which heretofore had a smooth outer surface, are provided with an external profile which advantageously consists of a crude thread.

The present invention is not limited, however, to adjusting or tightening nuts of this type but is directed generally to all cases where steel inserts, particularly reinforcing steel ends, must be protected against the action of heat which would adversely affect the physical properties of this material, and where a suitable profile required for the sleeve joint must be provided for later.

In the present invention, the truss forces are thus transmitted—with the interposition of profiled steel bodies which enclose the ends of the steel rods and/or are connected therewith at the end faces thereof either mechanically or by welding, using aluminothermically produced metal, preferably steel—through the steel pipe joint, i.e., by means of the toothed construction between the shaped steel bodies connected with the steel inserts, the casting metal, and the sleeve.

Figure 2:
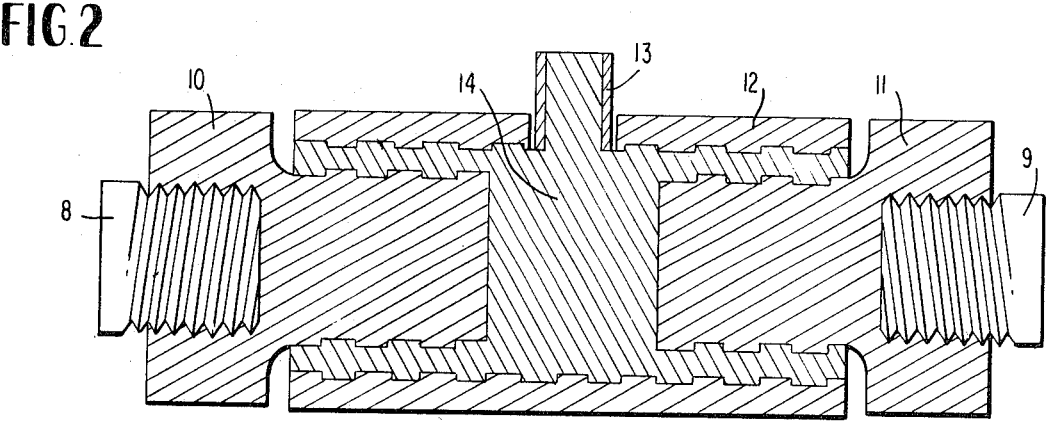
Figure 3:
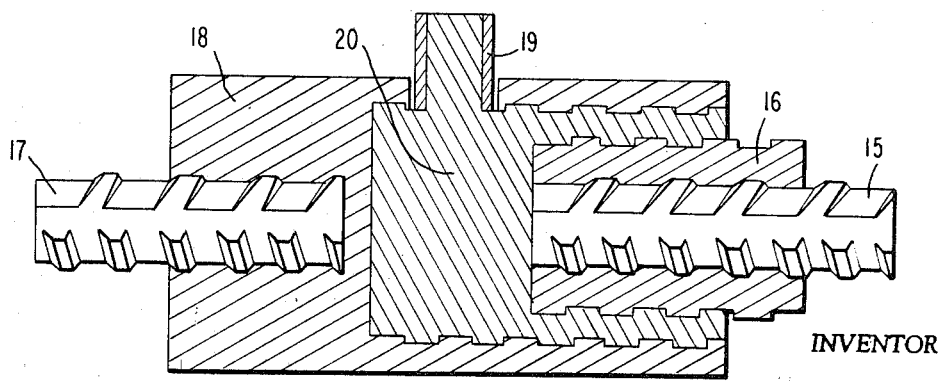
Figure 4:
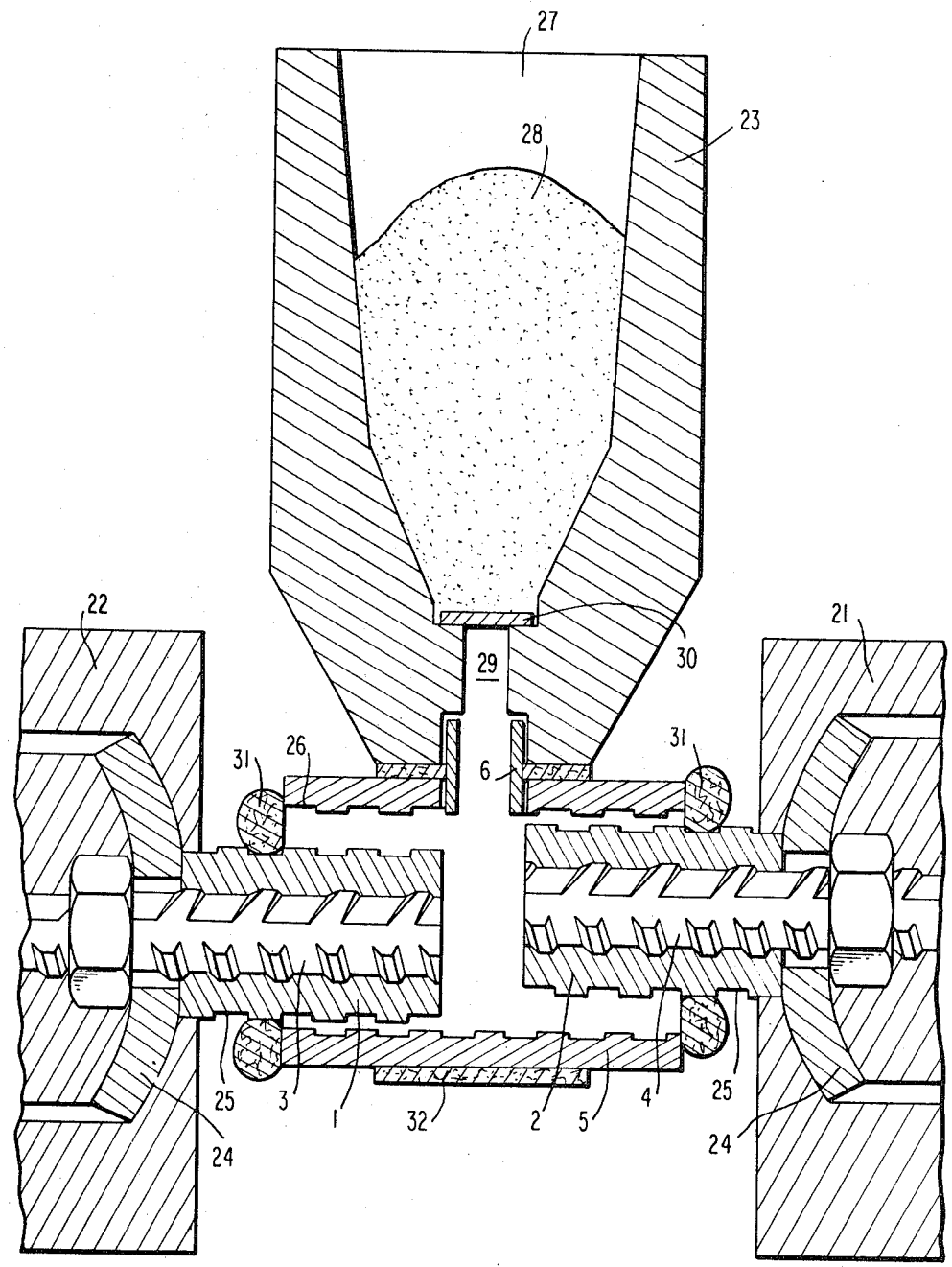

The present invention will be further illustrated by reference to the accompanying drawings wherein FIG. 1 is a view in cross section through a sleeve joint showing the shaped steel elements 1 and 2 being externally profiled in a threadlike manner, the tie or truss rods 3 and 4, the internally profiled steel pipe joint 5 with the passage 6 and the casting metal 7;

FIG. 2 is a view in cross section through a sleeve joint showing the shaped steel elements 10 and 11 mounted at the end faces thereof on the rod ends 8 and 9, the sleeve 12, the passage 13 and the casting metal 14;

FIG. 3 is a view in cross section through a sleeve joint showing the shaped steel elements 16 and 18 mounted on the ends of the steel inserts 15 and 17, the shaped element 18, simultaneously being constructed as a sleeve, the passage 19, and the casting metal 20; and FIG. 4 is a view in cross section through a sleeve joint according to FIG. 1 employed for purposes of connecting prefabricated prestressed concrete plates 21 and 22, and showing a reaction crucible 23 attached thereto for the aluminothermic production of the casting metal.

Referring to FIG. 1, the shaped steel elements 1 and 2, being externally profiled in a threadlike manner, are screwed onto the ends of the reinforcing steels 3 and 4. The shaped steel elements 1 and 2 are enclosed at a distance by an internally profiled steel pipe joint 5, and the joint or sleeve 5 includes a passage 6 through which aluminothermically produced metal 7, preferably steel, may be poured in.

In FIG. 2, the sleeve joint of the invention is illustrated as it is used for steel inserts or rods which, for example, do not have a profile suitable for the sleeve joint. In the embodiment shown, the shaped steel elements 10 and 11 are connected at the end faces thereof with the ends of the steel inserts 8 and 9. The shaped steel elements 10 and 11 are screwed, in this case, onto external threads on the ends of the steel inserts 8 and 9. For this purpose, the shaped steel elements 10 and 11 are provided in each case at one end thereof with a bore having a corresponding internal thread, and at the other end thereof with an external profile. The externally profiled ends of the shaped steel members are enclosed by a steel pipe joint 12 including a passage 13. Reference numeral 14 identifies the aluminothermically produced casting metal, preferably steel.

The embodiment according to FIG. 3 is a sleeve joint in which the end of the steel insert 15 is connected with an externally profiled shaped steel element 16, whereas the end of the steel insert 17 is enclosed by a shaped steel element 18 having a cavity therein so that one end of the element 18 constitutes an internally profiled sleeve. Reference numeral 19 identifies the passage for the aluminothermically produced casting metal 20, preferably steel.

FIG. 4 illustrates, in further detail, how a sleeve joint according to FIG. 1 is made. For example, prefabricated track-mounting plates 21 and 22, through the longitudinal axes of which extend the tie or truss rods 3 and 4 being threaded at least at the ends thereof, are intended to be connected with each other with a traction and pressure resistant connection of the clamping members being desired. In the course of a hot-rolling process, these reinforcing steels are provided with rib portions in the form of a helix and also form a thread suitable for screwing a nut thereon.

The reinforcing members 3 and 4 transmit the tensional forces thereof to the concrete by way of the anchoring shells 24. Screwed onto the ends of the bracing rods 3 and 4 which project beyond the anchoring shells 24 are the shaped steel elements in the form of long nuts 1 and 2 which simultaneously contribute to introducing the tensional forces into the anchoring. These nuts 1 and 2 enclose the bracing rod ends 3 and 4 in the full length thereof with which they project beyond the end faces of the finished parts 21 and 22. They are provided with a profile 25.

Slid over the ends of the nuts 1 and 2 is a steel pipe joint or sleeve 5 whose inside diameter is somewhat larger than the outer diameter of the nuts 1 and 2 so that it is possible to also compensate for differences in alignment within certain limits, which differences could arise when the tie or bracing rods to be interconnected are not in alignment with each other. The sleeve 5 also is longer than is necessary for achieving a firm connection with the nuts 1 and 2 so as to be adapted to absorb longitudinal differences at the same time. Also, the sleeve 5 is provided at the inside thereof with a profile 26. The sleeve 5 further includes an upwardly directed passage 6 which serves for mounting a crucible 23 thereon having a reaction chamber 27 for receiving the aluminothermic mixture 28 which produces the casting metal.

The crucible 23 has an outlet 29 which is closed off by inlaid metal platelets 30. The end-face openings of the sleeve 5 are closed off, for example, by means of asbestos 31. In this case, the sleeve 5 is simultaneously enclosed with a collar 32 of asbestos in order to prevent any possible melting through of the sleeve. Filled into the reaction chamber 27 of the crucible 23, after inserting the closure 30, is the aluminothermic mixture 28 which consists, for the purpose of producing steel, of iron oxide, aluminum and alloying elements. The mixture is then ignited in the form of points with an exothermic reaction thus being initiated, at which time the aluminum is converted into aluminum oxide and steel is liberated which will be deposited in the lower part of the reaction chamber 27. The molten aluminothermically produced steel melts through the closure 30 and runs through the outlet 29 and the passage 6 into the cavity of the sleeve 5 where it fills the cavity, formed by the sleeve 5 and the nuts 1 and 2, with steel 7.

The nuts 1 and 2 protect, at that time, the bracing members 3 and 4, being susceptible to the action of heat, so they will not be altered with respect to the physical properties thereof.

It will be obvious to those skilled in the art that many modifications may be made within the scope of the present invention without departing from the spirit thereof, and the invention includes all such modifications.

What is claimed is:

1. A sleeve joint for connecting steel inserts in steel-concrete construction which comprises shaped metal bodies threaded onto the ends of the inserts to be connected and surrounding and enclosing the major portion of the ends of said inserts to isolate them from the heat of aluminothermically produced metal, sleeve means enclosing at least part of both of the shaped metal bodies and being of larger diameter than said bodies, and aluminothermically produced metal in the space between the sleeve means and said bodies.

2. A joint according to claim 1 in which the shaped metal bodies are steel sleeves threaded onto the inserts.

3. A joint according to claim 1 in which the shaped metal bodies are steel nuts threaded onto the inserts.

4. A joint according to claim 1 in which the shaped metal bodies have external profiles thereon.

5. A joint according to claim 4 in which the external profiles are in the form of threads.

6. A joint according to claim 1 in which the sleeve means has an internal profile.

7. A joint according to claim 6 in which the sleeve means is fabricated from steel.

8. A joint according to claim 1 in which the aluminothermically produced metal is steel.

9. A sleeve joint for connecting steel inserts in steel-concrete construction which comprises a shaped metal body threaded onto the end of one of the inserts to be connected and surrounding and enclosing the major portion of the end of said insert to isolate it from the heat of aluminothermically produced metal, sleeve means threaded directly at one end thereof onto the end of the other insert to be connected and enclosing at the other end thereof at least part of the shaped metal body and being of larger diameter than said body, and aluminothermically produced metal in the space between the sleeve means and said body.

10. A joint according to claim 9 in which the sleeve means is fabricated from steel.

* * * * *